United States Patent
Thurau (10) Patent No.: US 11,706,297 B2
(45) Date of Patent: Jul. 18, 2023

(54) INTEGRATION OF A MACHINE INTO AN EXISTING DISTRIBUTED LEDGER NETWORK

(71) Applicant: Siemens Aktiengesellschaft, Munich (DE)

(72) Inventor: Oliver Thurau, Limburgerhof (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/914,902

(22) PCT Filed: Mar. 3, 2021

(86) PCT No.: PCT/EP2021/055362
§ 371 (c)(1),
(2) Date: Sep. 27, 2022

(87) PCT Pub. No.: WO2021/197748
PCT Pub. Date: Oct. 7, 2021

(65) Prior Publication Data
US 2023/0135714 A1  May 4, 2023

(30) Foreign Application Priority Data
Mar. 31, 2020  (EP) ..................... 20167243

(51) Int. Cl.
*H04L 67/1095* (2022.01)
*H04L 67/12* (2022.01)
*H04L 67/1097* (2022.01)

(52) U.S. Cl.
CPC ...... *H04L 67/1095* (2013.01); *H04L 67/1097* (2013.01); *H04L 67/12* (2013.01)

(58) Field of Classification Search
CPC .. H04L 67/1097; H04L 67/1095; H04L 67/12
See application file for complete search history.

(56) References Cited

U.S. PATENT DOCUMENTS

2017/0287090 A1  10/2017  Hunn et al.
2018/0191503 A1*  7/2018  Alwar ................. H04L 9/14
(Continued)

FOREIGN PATENT DOCUMENTS

DE  102018128219 B3 *  12/2019
DE  102018128219 B3   12/2019
(Continued)

OTHER PUBLICATIONS

International Search Report and the Written Opinion for International Patent Application PCT/EP2021/055362 dated May 20, 2021.

*Primary Examiner* — Shean Tokuta
(74) *Attorney, Agent, or Firm* — Lempia Summerfield Katz LLC (57) ABSTRACT

A system including a plurality of networked machines managed by a management system is disclosed. In the system, the machines and the management system each form nodes of a distributed ledger network. Further, the machines each have machine properties stored as a data record on a memory of the machine. Additionally, the machines each also have a standardized smart contract on the same or a further memory. The management system includes an integration contract configured to match standardized smart contracts to previous smart contracts already available in the distributed ledger network and transform the standardized smart contracts into the distributed ledger network. Further, a transformed smart contract controls a collaboration model between the networked machines and is executed so as to be implemented in the distributed ledger network computer.

17 Claims, 2 Drawing Sheets

(56) References Cited

U.S. PATENT DOCUMENTS

| | | | | |
|---|---|---|---|---|
| 2018/0227116 A1* | 8/2018 | Chapman | | H04L 9/0637 |
| 2019/0236598 A1* | 8/2019 | Padmanabhan | | G06Q 20/389 |
| 2019/0253257 A1* | 8/2019 | Yan | | G06F 16/27 |
| 2020/0167840 A1* | 5/2020 | Sun | | H04L 9/3239 |
| 2020/0250683 A1* | 8/2020 | Padmanabhan | | G06Q 20/38215 |
| 2020/0344132 A1* | 10/2020 | Padmanabhan | | H04L 41/22 |
| 2020/0357084 A1* | 11/2020 | Lerato Hunn | | H04L 9/32 |
| 2021/0182423 A1* | 6/2021 | Padmanabhan | | G06F 21/6245 |
| 2021/0243193 A1* | 8/2021 | Padmanabhan | | G06Q 10/10 |
| 2021/0266167 A1* | 8/2021 | Lohe | | G06Q 20/10 |
| 2021/0278823 A1 | 9/2021 | Sauer et al. | | |
| 2021/0286936 A1* | 9/2021 | Choudhari | | G06F 40/211 |
| 2022/0198562 A1* | 6/2022 | Celia | | G06Q 40/04 |
| 2022/0366494 A1* | 11/2022 | Celia | | G06Q 30/0201 |

FOREIGN PATENT DOCUMENTS

| | | | | |
|---|---|---|---|---|
| EP | 3582521 A1 * | 12/2019 | | G05B 19/4188 |
| EP | 3582521 A1 | 12/2019 | | |
| EP | 3890276 A1 * | 10/2021 | | H04L 67/1095 |
| EP | 4104422 A1 * | 12/2022 | | H04L 67/1095 |
| WO | WO-2019090005 A1 * | 5/2019 | | G06Q 50/18 |
| WO | WO-2020145458 A1 * | 7/2020 | | G06Q 20/3825 |

* cited by examiner

INTEGRATION OF A MACHINE INTO AN EXISTING DISTRIBUTED LEDGER NETWORK

The present patent document is a § 371 nationalization of PCT Application Serial No. PCT/EP2021/055362, filed Mar. 3, 2021, designating the United States, which is hereby incorporated by reference, and this patent document also claims the benefit of European Patent Application No. 20167243.3, filed Mar. 31, 2020.

TECHNICAL FIELD

The disclosure relates to a system including a plurality of networked machines managed by a management system, wherein the machines and the management system each form nodes of a distributed ledger network. The disclosure also relates to a method for integrating a machine into an existing distributed ledger network.

BACKGROUND

In industrial automation, so-called machine-to-machine (M2M) communication, is becoming increasingly important, particularly in connection with the developments in so-called Industry 4.0 scenarios. These involve machines interchanging capabilities among one another, (e.g., in self-initiated fashion), and frequently negotiating a collaboration model on the basis of their capabilities. In particular for smart manufacturing, e.g., production involving intelligent autonomously or semi-autonomously acting machines, M2M collaboration is the basis for production installations of the future.

Smart contracts managed and executable via distributed ledger networks are already used for M2M collaboration scenarios, such as in the realm of smart mobility, e.g., e-charging or smart parking. Currently, a smart contract has been able to be introduced or used for a blockchain technology platform jointly used by operators and users for an e-charging system, for example, in the associated programming language of the platform. By way of example, the platform Ethereum uses the programming language Solidity for its smart contracts. The platform Hyperledger Fabric uses the programming languages Go or NodeJS for the smart contracts, which are called chaincode on that platform.

There has been no standard for smart contracts to date. There is therefore a need to simplify the use of smart contracts for machines in an industrial setting.

SUMMARY AND DESCRIPTION

The scope of the present disclosure is defined solely by the appended claims and is not affected to any degree by the statements within this summary. The present embodiments may obviate one or more of the drawbacks or limitations in the related art.

The disclosure relates to a system including a plurality of networked machines managed by a management system, wherein the machines and the management system each interact as nodes or clients of a node of a distributed ledger network. The machines each have machine properties as a dataset stored on a respective memory of the respective machine. Additionally, the machines each have a respective normalized smart contract on the same or a further memory. The management system has an integration contract configured to match respective normalized smart contracts with previous smart contracts already available in the distributed ledger network and to transform the normalized smart contracts into the distributed ledger network. A transformed smart contract is configured to regulate a collaboration model between the networked machines and to be executed in the distributed ledger network in computer-implemented fashion.

The system is therefore based on a system of networked machines, wherein a management system, (e.g., a management system of IoT devices), manages the networked machines. The management system may be in central form or in a form distributed in decentralized fashion over multiple instances of the machines. By way of example, the machines are different components of an installation system, (e.g., robots, machine tools, production machines, AGVs (autonomous guided vehicles), etc.). Such or similar so-called IoT (Internet of Things) devices are intended to facilitate information relating to optimized use of the respective machine, or an optimized utilization level when comparing multiple machines with one another, flexibly within an installation. This involves machine properties being stored on the respective machines, the properties being available as a dataset stored on a respective memory, with the result that relevant information may be interchanged between the networked machines, in particular directly.

Additionally, the machines are then connected to one another in a distributed ledger network, e.g., the machines each either form a node in the distributed ledger network themselves or interact as a client of a specific existing node in the DLT network. By way of example, this is a blockchain network. The machines further have a normalized smart contract, advantageously on the same memory as that on which the machine properties are also stored. Alternatively, a further memory may be used.

A normalized smart contract within the context of the present application is understood to mean a smart contract that may be stored in a normalized or standardized description language or language. There is not necessarily provision for only one language as a standard. In particular, multiple standards that are eligible for the format of the smart contract may exist, and the normalized smart contract may be formatted in one of these standards.

The normalized smart contract may also be elevated to produce a standardized smart contract.

The management system of the networked machines has an integration contract. The way in which this works is firstly to examine the normalized smart contracts added by a machine for smart contracts already present in the distributed ledger network. Matching is performed to ascertain whether the smart contract is already known. Moreover, the way in which the integration contract works is to transform a normalized smart contract added by a machine into the distributed ledger network. The transformation act may also be referred to as conversion. This denotes the act of putting the normalized smart contract into a machine-executable form. In one case, it may also involve just calling the code for execution purposes.

The transformed and therefore executable smart contract then regulates a collaboration model between the networked machines. Advantageously, conditions under which use of the machine is possible are reproduced in the smart contract. By way of example, use conditions such as pay-per-use conditions are proposed that may be accepted by other machines in the network.

The transformed smart contract is then executed in the distributed ledger network in computer-implemented fashion. By way of example, it specifies what needs to be checked for a transaction or which subsequent activities need to be initiated. Furthermore, the smart contract may execute programs in automated fashion, for example. Smart contracts execute logic, stored in the program code, that describes dependencies between collaborating machines. By way of example, the program code stores conditions that need to be met or demonstrated by a collaboration partner, that is to say one of the machines in the network, so that actions are started or performed on the other machine, for example which predefines the smart contract.

Advantageously, the proposed system allows complete automation of the integration of new or external machines into a network, (e.g., an operator network), of machines, in particular an installation or factory. Integration of an information model related to a distributed ledger network is advantageously facilitated. In distributed ledger networks or blockchain networks, the integration or onboarding of smart contracts is facilitated flexibly and independently of specific smart contract languages or formats used in the machine network. In particular, an existing machine network within an IoT installation is advantageously additionally provided with the opportunity to set up and use intelligent automated contracts between the machines.

According to one configuration, the collaboration model includes business conditions for performing work acts and/or use conditions and/or status changes depending on the work act performed. By way of example, the type of billing model for services of the machine is specified, for example, a pay-per-use model or a pay-per-part model or a pay-per-time model. It is furthermore possible to stipulate for which amount, (e.g., amount of tokens), which type of service of the machine may be rendered. By way of example, there is a stipulation regarding which type of service may be rendered to what degree. By way of example, a specific number of screws may be screwed in or holes drilled or rivets punched for a specific amount of tokens. The tokens represent a certain benefit or value, for example, in the distributed ledger network. The DLT network uses one or possibly more specific token definitions, for example, and employs them in standardized fashion.

Moreover, the collaboration model for example further stipulates which status changes the smart contract causes. Depending on whether conditions such as work acts performed are met, the smart contract triggers a change of status, for example the status of all machines involved in a smart contract is updated such that acts performed such as the service performed or the payment made are documented. In particular, tokens are transmitted. It is furthermore conceivable for the smart contract to trigger a book money transaction if it is able to have an appropriate account. By way of example, the updated status may furthermore make it apparent to other machines in the network that a machine is occupied or unavailable for a specific period of use.

According to one configuration, the machine properties are available in a standardized format, which is in particular interchangeable by the module type package method. The respective normalized smart contract is available in the same standardized format. This advantageously allows particularly simple processing of the information provided by the machine, e.g., the machine properties on the one hand and the smart contract conditions on the other. By way of example, arguments of the smart contract may therefore advantageously be oriented to standardized attributes of the directory containing the machine properties. By way of example, a feature repository of the machine lists attributes that may be delivered to the smart contract as an argument. The smart contract therefore "understands" these arguments without further conversion or transformation.

Advantageously, a negotiation of capabilities that already exists or is installed in the system of networked machines may therefore also be used directly for executing smart contracts between collaborating machines. The concept of the module type package (MTP) is then used, which is produced by a functional description, for example, from engineering data of an automation. The use of such a description standard conveys properties of installation components or interfaces or state descriptions in normalized fashion. The expansion of the MTP concept to smart contracts executable in a distributed ledger network as a new segment (e.g., facet) allows the smart contracts to be incorporated into a machine network.

According to one configuration, the standardized format provided is Automation Markup Language or at least one executable code format, in particular Solidity or Hyperledger Fabric chaincode, in particular NodeJS or Go. In one advantageous variant, a generalized smart contract in the Automation Markup Language format, AML format for short, is therefore used. This is subsequently put into an executable form on a node of the distributed ledger network by using a normalization function. By way of example, the smart contract is available in AML and is put into the code format Solidity by a normalization function. If different collaborating machines within the machine network then use Ethereum, for example, as the distributed ledger platform, and therefore wish to execute smart contracts in the programming language Solidity, they may convert or transform the information of the smart contract that is added by a machine in AML code and then execute it in Solidity.

In an alternative advantageous variant, the smart contract is provided in at least one executable code format, for example in multiple executable code formats. By way of example, it is stored in the memory twice, so to speak, for example, once as Solidity code and once as Hyperledger Fabric chaincode. A code format executable on different platforms is therefore available directly on the machine. The application of a normalization function then advantageously is included merely in the calling act. The specific smart contracts stored in executable code format may then be used flexibly on different platforms, such as Ethereum or Hyperledger Fabric. By way of example, a machine may thus be flexibly integrated into an existing distributed ledger network in different installations. This may be useful in particular at interfaces between different installations from different manufacturers, for example, in the case of machines used in logistical acts.

According to one configuration, the smart contract describes a dynamic model for logic operations between the machines. A dynamic model such as this, which describes logic dependencies of the machines and of the execution acts or execution tasks performed by the respective machines, is available in a program code, for example. By way of example, the smart contract describes automatically performable acts or status changes and in particular transactions that need to be recorded in the distributed ledger network, depending on reports or status reports from the machines involved.

The disclosure further relates to a method for integrating a machine into an existing distributed ledger network. In the method, the machine to be integrated networks itself with a machine network including a plurality of networked machines managed by a management system. The machines each work together as nodes or clients of a node in a distributed ledger network. The machines each have machine properties as a dataset stored on a respective memory of the respective machine and interchange the machine properties in the machine network. The machines each further have a respective normalized smart contract on the same or a further memory and interchange the normalized smart contract by the distributed ledger network. The management system has an integration contract. The machine to be integrated provides the respective normalized smart contract to the management system. The management system matches the respective normalized smart contract with previous smart contracts already available in the distributed ledger network and, depending on availability, transforms the respective normalized smart contract into the distributed ledger network. Further, a transformed smart contract regulates a collaboration model between the networked machines and is executed in the distributed ledger network in computer-implemented fashion.

This aspect of the disclosure is therefore also based on a networked machine network in which machine properties are interchanged and then smart contracts are additionally interchanged with one another and a smart contract of a new machine to be integrated is integrated in the distributed ledger network. By way of example, the acts that machine properties are interchanged and that respective normalized smart contracts are interchanged are performed at the same time. It is likewise conceivable for machine properties to already have been interchanged in order to identify potentially promising collaborating machines, and for smart contracts to be interchanged only in a later act.

In particular, a machine that is to be newly included and integrated is networked into the machine network at an earlier time or in an act together with the transmission of machine properties and/or smart contracts.

In order to prevent uncontrolled interchange or uncontrolled adoption of smart contracts, which may refer to the execution of programs stored in the smart contract, the normalized smart contract of a machine is examined by the management system of the machine network. This involves matching whether the smart contract is already known or is already available in the distributed ledger network. Because the smart contract to be examined is available in normalized or standardized form, it is comparable with already existing smart contracts that are likewise stored in normalized or standardized fashion.

According to one configuration, the matching includes the act that when a smart contract relating to identical collaboration partners or the same collaboration model is already available, the smart contract already available is overwritten. The smart contract already available is overwritten by the normalized smart contract of the machine to be integrated. This advantageously means that an up-to-date smart contract is stored, which may be identified by using a version identifier, for example.

According to one configuration, the matching includes the act that when a smart contract relating to identical collaboration partners or the same collaboration model is already available, the respective normalized smart contract is stored with an indication of a new version identifier. A history may be created, and different version statuses may be tracked afterwards. The collaboration partners may stipulate machine types, in particular. Alternatively, machine identities or machine IDs that are eligible as subscribers to the smart contract may also be stored.

According to one configuration, the matching includes the act that when a smart contract relating to identical collaboration partners or the same collaboration model is already available, the respective normalized smart contract is not stored or is stored only under specific circumstances.

By way of example, if an earlier smart contract is overwritten, this involves a smart contract of another machine, to be integrated later, that provides the same conditions and, at the same time, has drafted the collaboration model in the smart contract that is now to be integrated. It is likewise conceivable for it to involve a smart contract of the same machine as has already networked itself earlier.

The circumstances under which a new smart contract may be installed or deployed may advantageously be stipulated in the distributed ledger network. By way of example, operating rules, so-called standard operating procedures, may have provision for circumstances that need to be satisfied in order for a smart contract that is to be integrated to be stored. It is furthermore conceivable for future integrations of specific smart contracts not to be permitted in an already integrated and installed smart contract.

According to one configuration, the matching includes the act that when there is no availability, the respective available smart contract is stored. By way of example, there is then no concern about conditions from the smart contract that is to be integrated colliding with conditions in earlier smart contracts in the distributed ledger network.

According to one configuration, the normalized smart contract has an associated interface for describing methods and the methods describe collaboration options between the machines. The smart contract and an associated interface are stored in combination with one another in the MTP, for example.

The interface has the function of describing the methods and the arguments thereof that are required in order to perform specific transactions to fulfil a contract. By way of example, methods may be called, such as "transfer token," e.g., performance of a function that leads to the transmission of tokens in the distributed ledger network. Transfer of the tokens may be used to transmit a virtual currency or a virtual medium of exchange corresponding to the value of the service in the network.

According to one configuration, the interface further describes arguments used as input for the methods. In addition to the method that is called, it is also necessary to deliver an argument, for example, an amount of tokens to be transmitted or an addressee reproduced in the method. By way of example, a context ID or a vehicle ID is additionally conveyed. A wide variety of functions are possible as the method, the functions being conceivable for performing the operation to comply with the requirements from the smart contract. They describe collaboration options between the machines by describing which functions are meant to be able to be called by one of the machines involved when the smart contract is executed. By way of example, the method that creates a report about a performed task is also conceivable. By way of example, one argument is a status change.

According to one configuration, the arguments are stored on the machine in standardized fashion and in particular correspond to standardized attributes of the machine properties.

According to one configuration, the machine properties describe capabilities of a respective machine and are stored in such standardized fashion that other machines are able to process information about the capabilities. Such negotiation of production acts or process chains advantageously takes place autonomously between the machines. In addition to autonomous and independent negotiation among the machines, the standardized format may also be used by a management system that monitors or undertakes the communication by the machines among one another.

According to one configuration, during transformation by a normalization function the smart contract is put into a form that all DLT network subscribers understand, or that fits the DLT network. In particular, the smart contract is thus also put into a form that may be called by the machine. The less normalized the form in which the smart contract is available, the more complex the normalization function is to produce. For smart contracts that are already stored in executable code, the normalization function may be in simpler form and may be restricted to calling the code. If a generalized normalized smart contract is used, the normalization function includes conversion into the callable form.

In so-called intelligent machines or machines in cyber-physical systems, there may therefore advantageously be provision for automation products that firstly add and provide the normalized smart contracts described and secondly integrate them in a distributed ledger network of the machines. Already available machine description repositories are particularly advantageously used for this purpose.

Machines are therefore integrated in automated fashion into machine networks of an installation that communicate via a communication network, for example, and, at the same time, for example into machine blockchain networks including the same subscribers. In particular, the basis of the module type package concept is used, the concept being used for interchanging machine properties and smart contracts for participation in a distributed ledger network, in particular blockchain network.

The disclosure further relates to a computer program product having a computer program that includes code for performing the method according to one of the configurations described above when the computer program is executed on a program-controlled device. In particular, the computer program is executed in distributed fashion in the machine network and/or distributed ledger network.

BRIEF DESCRIPTION OF THE DRAWINGS

The disclosure is explained in more detail below based on the exemplary embodiments with the aid of the figures, in which.

DETAILED DESCRIPTION

Figure 1:
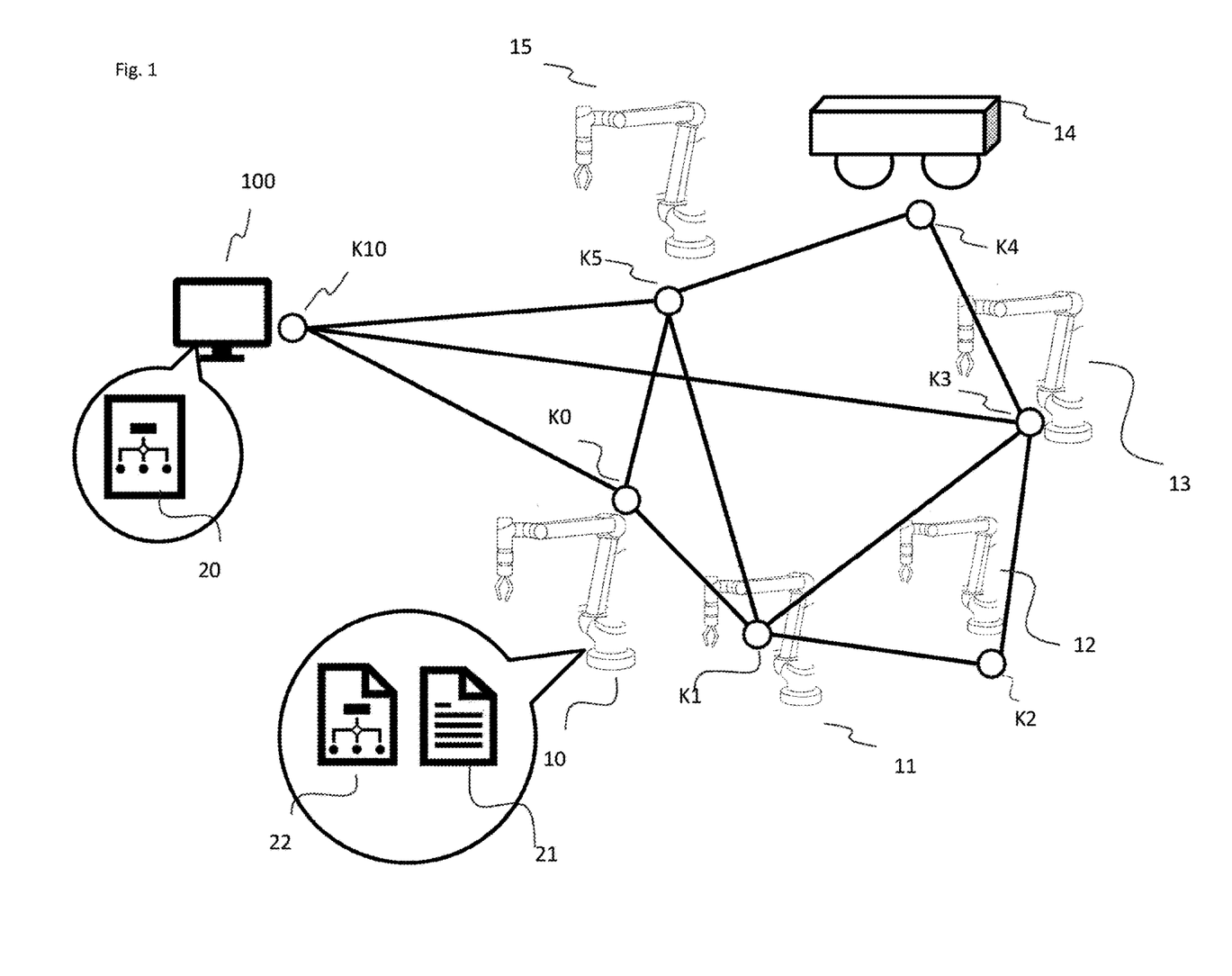
FIG. 1 depicts a schematic representation of a machine network and a machine blockchain network according to a first exemplary embodiment.

FIG. 1 depicts five robots 10, 11, 12, 13, 15 and an AGV 14 to illustrate a machine network in a factory. For representational reasons, the number has been limited to six machines, exemplary embodiments with significantly more machines, for example several 100 machines, being possible. The robots 10, 11, 12, 13, 15 are shown as gripper arm robots for the purposes of this first exemplary embodiment. Other machines that are possible for a collaboration in an industrial automation network and other robots, for example parallel kinematics or other serial kinematics, in particular having any number of degrees of freedom, are likewise advantageously usable.

In the first exemplary embodiment, the robots 10, 11, 12, 13, 15 are configured to cooperate with one another in order to assemble a manufactured part, (e.g., a printed circuit board), using distributed tasks. To this end, the robots 10, 11, 12, 13, 15 interchange information about their respective machine properties among one another.

Moreover, according to the first exemplary embodiment, a so-called AGV 14, autonomous guided vehicle, that is to say a transport device autonomously traveling around in an installation, is used. The AGV 14 carries a workpiece to be handled by the robots and transports it in particular to the different robots belonging to different production stations.

By way of example, FIG. 1 shows the robot 10 to be adding a dataset relating to its machine properties 21, e.g., to have stored the dataset on its memory, and, for example, to be announcing it in the machine network of its own accord or on request. There follows a so-called skill-based planning of production acts, the planning being able to be carried out centrally by the instance of the management system, or else in decentralized fashion, in a manner distributed over the robots. By way of example, a partial task of the total production task needs to be accomplished in the network, and machine properties relating to the utilization level of the individual machine are used to decide which robot undertakes the partial task. Similarly, the decision may be made on the basis of a statement relating to the speed at which one of the robots is able to process the partial task.

According to the first exemplary embodiment, the production installation is additionally intended to be able to operate on a blockchain basis. To this end, the individual robots 10, 11, 12, 13, 15 and the AGV 14 are each intended to form nodes K0, K1, K2, K3, K4, K5 of a blockchain network. That is to say that the machines are each intended to be able to participate in the blockchain network, in particular by conveying transactions to the blockchain network and/or storing the blockchain database.

By way of example, a private blockchain structure or a so-called consortium blockchain structure is involved, wherein participation in the blockchain network is limited to the subscribers of the production network. In an industrial setting, for example, private blockchains in which the consensus method takes place within a consortium whose members are known to one another or to a management instance, for example, or achieve a specific confidence level, are used. By way of example, only nodes that have been authenticated in the communication network of the production installation may participate in the blockchain network.

The blockchain network within the production installation offers known advantages such as data management available in decentralized fashion, transactions stored with tamper protection, and trackable transaction chains. Moreover, the blockchain network according to the first exemplary embodiment is used in such a way that smart contracts reproducing collaboration models between the robots may be reciprocally announced and executed. A synergy is therefore particularly advantageously produced for a communication network with interchange of machine properties and a blockchain network for executing smart contracts, which allows the robots with their respective properties and collaboration conditions to cooperate fully autonomously in the first place.

FIG. 1 in turn shows the robot 10 to have stored not only the machine properties 21 but also a smart contract 22 on its memory. The machine properties 21 and the smart contract 22 are depicted only for the robot 10 for the sake of clarity, but may advantageously be present for all robots or, in general terms, for machines that may be used autonomously or at least flexibly within an installation.

By way of example, two milling robots 12, 13 are integrated in the communication network in the production installation. By way of example, both robots have been authenticated by way of a machine ID and authenticated using cryptographic methods via the communication connection. Both robots are equipped with cryptographic keys, for example, for this purpose. Both milling robots convey, for example, their respective property of being able to perform a specific milling method. By way of example, this information is sent to the AGV 14, which carries a part that is to be milled. By way of example, it is the responsibility of the AGV to select one of the two milling robots 12, 13. Besides the machine properties available for the two milling robots, information about a collaboration model provided by the respective milling robot is also available.

The collaboration model describes the conditions under which, in particular the virtual price at which, the milling method may be performed. By way of example, the virtual price represents a utilization level of the respective milling robot. The price for a milling method by a robot that may be frequented due to its physical position in the installation is higher, for example, than a less-frequented robot. This may in turn be embraced, for example, in the central or decentralized planning for the production method, for example, by optimizing the method for cost efficiency.

The smart contract is firstly used to provide the information concerning the conditions under which a collaboration with a respective robot may be performed. This information is stored in the blockchain and may therefore be queried by the AGV 14, for example. Moreover, the collaboration may furthermore be handled in the blockchain network with blockchain support by way of the smart contracts. As part of the collaboration, there may also be regulations regarding which actions are initiated following completion of the partial task by a milling robot, for example, how a digital twin of a workpiece is configured or which transactions relating to a payment for the service are stored in secure fashion in the blockchain.

As executable logic, the smart contracts therefore form the basis for accompanying or documenting the whole sequence of a production, for example, which sequence is planned or stipulated on the basis of the machine properties and collaboration models, and for supporting the sequence by saving consistent datasets in the blockchain.

There may advantageously be provision in the installation for a management system 100 as central instance, the management system in particular engaging in the production process wherever autonomous machines are not involved. Moreover, the management system may perform superordinate tasks or coordination tasks with further factory units or logistics units. By way of example, the management system 100 coordinates the joining and authentication of machines in relation to the machine network. Furthermore, the management system has an integration contract 20, which may also be referred to as an onboarding smart contract. To this end, the management system also interacts as a node.

Figure 2:
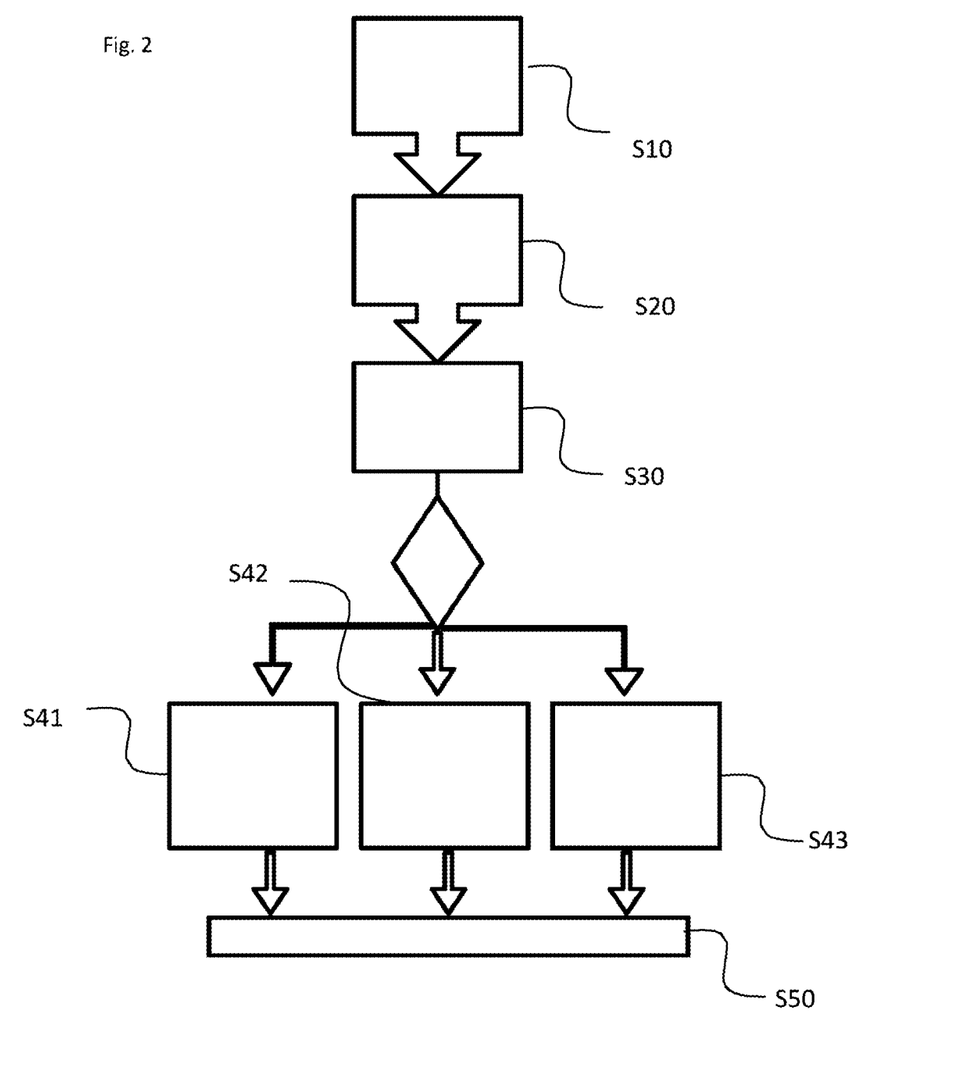
FIG. 2 depicts a schematic representation of a method for integrating a smart contract of a machine into a blockchain network according to a second exemplary embodiment.

The way in which the integration contract 20 works is explained in more detail on the basis of FIG. 2 and a second exemplary embodiment. In act S10, a robot 10 with an associated smart contract 22 networks itself with the blockchain network. To this end, it undergoes an authentication process, (e.g., beforehand), in order to be able to act as a participating node in the blockchain network. This act is in particular an act within an onboarding process. In act S20, the robot 10 provides its normalized smart contract 22 to the blockchain network. The normalized smart contract 22 is published in the network as a transaction, for example, and the transaction is validated using the consensus mechanism agreed in the network, for example.

The normalized smart contract 22 is matched with smart contracts that are present in the blockchain network in act S30 before use in the blockchain network. The aim of this is to examine the smart contract that is to be newly included for compatibility with already valid smart contracts and for harmlessness. The integration contract 20 is provided for this examination process. The integration contract 20 may be stored centrally on the management system.

The management system 100 may also be provided as a decentralized instance that is distributed over a few nodes, for example. In this case, it is necessary to provide that at least a stipulable proportion of the nodes that perform tasks of the decentralized management system are a permanent part of the network.

The integration contract 20 may therefore likewise be stored in decentralized fashion in the blockchain network, at least on those nodes that form the management system, and in particular on all participating nodes.

In scenarios in which a central unit is already present on the basis of the system structure of the machine network, this may advantageously additionally be used for the task of smart contract onboarding.

The check on the normalized smart contract 22 may reveal that the same smart contract has already been stored in the blockchain network at an earlier time. In this event, act S41 of overwriting the old smart contract or storing the new smart contract with the same identifier and a new version number may follow, for example.

In an alternative act S42, the storage takes place in restricted fashion, for example, only when there is provision for the option for a replacement in the operating rules, the so-called SOPs. By way of example, the intention is to prevent the incorporation of the new smart contract from unintentionally resulting in repercussions for existing collaborations. At the same time, however, the intention is also to allow already established collaborations to change over to a more up-to-date smart contract as required.

By way of example, a new smart contract that is intended to be newly established by the AGV 14 in an installation affords better troubleshooting. Other AGVs in the installation that are intended to be used under the same conditions as the new AGV 14 to be integrated, that is to say that provide the same collaboration model, are likewise intended to be able to use the new smart contract. For some installations, in particular continuous processes, the intention is to be able to change to the newer smart contract, for example, only during a planned downtime phase, that is to say a down time provided for the purposes of updates or other maintenance in the installation.

The check may further reveal that a normalized smart contract 22 is unknown.

There may therefore also be provision for the further alternative act S43 that the normalized smart contract 22 is created from scratch. In particular, the management system may inspect information available for unknown smart contracts for specific requirements, e.g., for trustworthiness of the header information or code consistency.

The various alternative acts are followed by act S50 of transformation of the normalized smart contract 22, which leads to a code that is executable in the blockchain network. By way of example, the normalized smart contract 22 of the AGV 14 is an updated version of a smart contract that reproduces rules for the undertaking of transport processes for workpieces by the AGV. The AGV 14 has the smart contract deployed in the system by way of the onboarding contract of the management system.

By way of example, the AGV 14 uses the module type package method to indicate machine properties 21 such as an operating time remaining on the basis of the battery state of charge. The MTP likewise stores the normalized smart contract 22, which is advantageously stored in the same standardized language as the machine properties 21, for example in AML (Automation Markup Language). As such, a shared standardized format is advantageously used for handling the machine properties 21 and the smart contract 22 in a likewise shared standardized interchange method (MTP).

The management system 100 applies a normalization function to the normalized smart contract 22 and converts the latter into an executable smart contract code. Depending on the blockchain platform, code in the programming languages Solidity, NodeJS, Go, etc., is executed.

All in all, an industry-compatible transformation of smart contracts, which are used between machines to simplify collaboration of the machines among one another, is therefore provided in the various forms presented.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

Although the disclosure has been illustrated and described more thoroughly in detail by way of the exemplary embodiments, the disclosure is not restricted by the examples disclosed and other variations and combinations may be derived therefrom by a person skilled in the art without departing from the scope of protection of the disclosure.

The invention claimed is:

1. A system comprising:
a management system; and
networked machines managed by the management system,
wherein the networked machines and the management system each interact as nodes or clients of a node of a distributed ledger network,
wherein each networked machine of the networked machines has machine properties as a dataset stored on a respective memory of the respective machine,
wherein each networked machine of the networked machines further has a respective normalized smart contract on a same memory or a further memory,
wherein the management system has an integration contract configured to match respective normalized smart contracts with previous smart contracts already available in the distributed ledger network and to transform the normalized smart contracts into the distributed ledger network, and
wherein a transformed smart contract is configured to regulate a collaboration model between the networked machines and to be executed in the distributed ledger network in a computer-implemented fashion.

2. The system of claim 1, wherein the collaboration model comprises business conditions for performing work steps, use conditions, status changes, or combinations thereof depending on the work step performed.

3. The system of claim 1, wherein the machine properties are available in a standardized format, and wherein the respective normalized smart contract is available in a same standardized format.

4. The system of claim 3, wherein the standardized format is Automation Markup Language or at least one executable code format.

5. The system of claim 1, wherein the smart contract describes a dynamic model for logic operations between the networked machines.

6. The system of claim 3, wherein the standardized format is interchangeable by a module type package method.

7. The system of claim 4, wherein the least one executable code format is Solidity or Hyperledger Fabric chaincode.

8. A method for integrating a machine into an existing distributed ledger network, the method comprising:
networking the machine, by the machine itself, with a machine network including a plurality of networked machines managed by a management system having an integration contract, wherein the machine and the plurality of networked machines each work together as nodes or clients of a node in a distributed ledger network, wherein the machine and the plurality of networked machines each have machine properties as a dataset stored on a respective memory of the respective machine and interchange the machine properties in the machine network, and wherein the machine and the plurality of networked machines each further have a respective normalized smart contract on a same or a further memory;
interchanging the normalized smart contract by the distributed ledger network;
providing, by the machine, the respective normalized smart contract to the management system;
matching, by the management system, the respective normalized smart contract with previous smart contracts already available in the distributed ledger network using the integration contract;
transforming, depending on availability, the respective normalized smart contract into the distributed ledger network;
regulating, by the transformed smart contract, a collaboration model between the networked machines; and
executing the transformed smart contract in the distributed ledger network in a computer-implemented fashion.

9. The method of claim 8, wherein the matching comprises overwriting the previous smart contract already available when a smart contract relating to identical collaboration partners or a same collaboration model is already available.

10. The method of claim 8, wherein the matching comprises storing the respective normalized smart contract using a new version identifier when a smart contract relating to identical collaboration partners or a same collaboration model is already available.

11. The method of claim 8, wherein the matching comprises not storing the respective normalized smart contract or storing normalized smart contract only under specific circumstances when a smart contract relating to identical collaboration partners or a same collaboration model is already available.

12. The method of claim 8, wherein the matching comprises storing the respective normalized smart contract when there is no availability for the respective normalized smart contract in the distributed ledger network.

13. The method of claim 8, wherein the normalized smart contract comprises an associated interface for describing methods, wherein the methods describe collaboration options between the machines.

14. The method of claim 13, wherein the interface further describes arguments used as input for the methods.

15. The method of claim 14, wherein the arguments are stored on the machine in standardized fashion and correspond to standardized attributes of the machine properties.

16. The method of claim 8, wherein the machine properties describe capabilities of a respective machine and are stored in such standardized fashion that respective other machines are able to process information about the capabilities.

17. The method of claim 8, wherein, during the transforming by a normalization function, the normalized smart contract is put into a form that is understood by subscribers of the distributed ledger network or that fits the distributed ledger network.

\* \* \* \* \*